United States Patent [19]

Smith

[11] Patent Number: 4,574,859

[45] Date of Patent: Mar. 11, 1986

[54] RIM ASSEMBLY

[75] Inventor: William T. Smith, Uniontown, Ohio

[73] Assignee: The Goodyear Tire & Rubber Company, Akron, Ohio

[21] Appl. No.: 734,241

[22] Filed: May 14, 1985

Related U.S. Application Data

[63] Continuation of Ser. No. 458,240, Jan. 17, 1983, abandoned.

[51] Int. Cl.$^4$ .............................................. B60B 25/18
[52] U.S. Cl. ............................ 152/410; 152/DIG. 10
[58] Field of Search ............... 152/396, 398, 409, 410, 152/DIG. 10; 301/35 SL, 95, 96, 97

[56] References Cited

U.S. PATENT DOCUMENTS

| | | | |
|---|---|---|---|
| 2,817,383 | 12/1957 | Lafaye | 152/409 |
| 2,835,303 | 5/1958 | Woodward | 152/410 |
| 3,599,698 | 8/1971 | Skehan et al. | 152/410 |
| 4,003,421 | 1/1977 | Lejeune | 152/409 |
| 4,043,375 | 8/1977 | Casey | 152/410 X |
| 4,144,922 | 3/1979 | Strader | 152/410 |
| 4,369,826 | 1/1983 | Hendrickson | 152/410 |
| 4,438,797 | 3/1984 | Suckow | 152/410 |

Primary Examiner—Robert B. Reeves
Assistant Examiner—Russell D. Stormer
Attorney, Agent, or Firm—L. R. Drayer

[57] ABSTRACT

A multi-piece rim assembly comprises a rim base, sealing member, lock ring and bead seat band. The sealing member and lock ring have specified positions such that each is at least partially disposed in an annular groove in the radially outer surface of the rim base, with the lock ring being nearer to an axial end of the rim base than the sealing member. The bead seat band is coaxial with and slidably mounted around the rim base. When all of the components of the rim assembly are in their specified positions, the bead seat band engages the sealing member to form an airtight seal. If the entire lock ring is not in its specified position, an axial end of the bead seat band contacts the lock ring and prevents the airtight seal from being formed.

3 Claims, 9 Drawing Figures

RIM ASSEMBLY

This is a continuation of application Ser. No. 458,240 filed Jan. 17, 1983, now abandoned.

BACKGROUND OF THE INVENTION

This invention relates to a rim assembly for mounting pneumatic tires thereon, and more specifically to a rim assembly that is unable to form an airtight seal if any part of the lock ring is not in its specified position.

BRIEF DESCRIPTION OF THE DRAWINGS

The invention will be better understood by referring to the figures of the drawing, wherein.

DETAILED DESCRIPTION OF THE INVENTION

Figure 1:
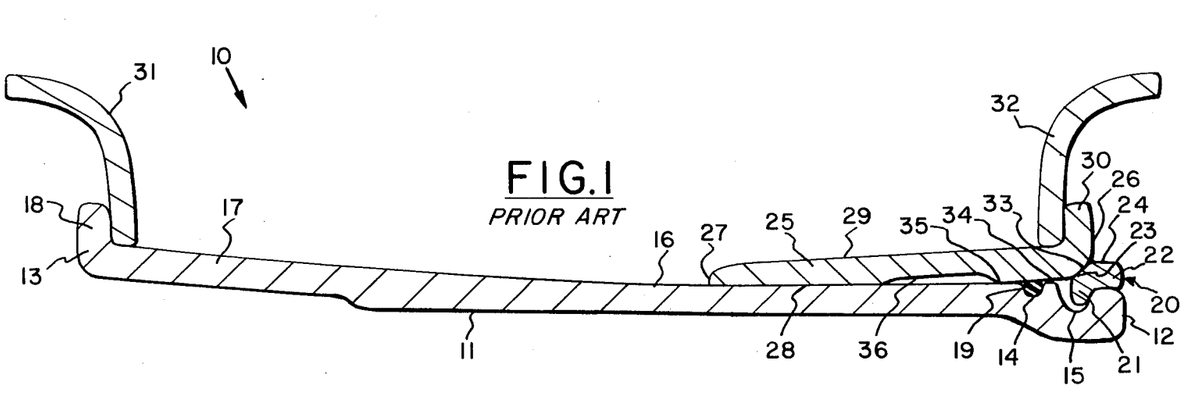
FIG. 1 is a radial cross-sectional view of a rim assembly known in the prior art.

Referring to FIG. 1, there is shown a radial cross-sectional view of a rim assembly 10 made in accordance with the prior art. The prior art rim assembly has a cylindrical rim base 11 with first 12 and second 13 axial ends, and a pair of annular grooves 14,15 in the outer circumferential surface 16 of the rim base near the first axial end 12. A bead seat 17 extends axially inwardly from the second axial end 13 of the rim base 11, and a flange 18 extends radially outwardly from the second axial end 13 of the rim base. The bead seat may be inclined with respect to the axis of rotation of the assembly.

As used herein and in the appended claims, "axial" and "axially" refer to directions that are parallel to the axis of rotation of a rim assembly, and "radial" and "radially" refer to directions that are perpendicular to the axis of rotation of a rim assembly. As used herein, the centerplane of a rim assembly is a plane that is perpendicular to the axis of rotation of the assembly and is located midway between the axial ends of the rim base of the assembly. As used herein and in the appended claims, "axially inward" refers to a direction going toward the centerplane of a rim assembly and "axially outward" refers to a direction going away from the centerplane of a rim assembly; "radially inward" refers to a direction going toward the axis of rotation of a rim assembly and "radially outward" refers to a direction going away from the axis of rotation of a rim assembly.

A portion of an annular sealing member 19, such as an elastomeric "O" ring, is located in the annular groove 14 that is furthest away from the first axial end 12 of the rim base 11, and a portion of the sealing member extends radially outwardly of the outer circumferential surface 16 of the rim base. A split lock ring 20 has a specified position such that a first portion 21 of the lock ring is located in the annular groove 15 that is closest to the first axial end 12 of the rim base while a second portion 22 of the lock ring extends radially outwardly of the outer circumferential surface 16 of the rim base and axially outwardly of the annular groove 15 that is closest to the first axial end of the rim base. The second portion 22 of the lock ring 20 has an axially inner surface 23 for engaging the bead seat band 25 and a radially outermost surface 24. The radially outermost surface of the second portion of the lock ring has a predetermined radius when the lock ring is in its specified position. A cylindrical bead seat band 25 has first 26 and second 27 axial ends and radially inner 28 and outer 29 surfaces. The bead seat band is coaxial with, and slidably mounted about, the rim base such that the first axial end 26 of the bead seat band is near the first axial end 12 of the rim base. The radially outer surface 29 of the bead seat band is inclined, with respect to the axis of rotation of the assembly, to the same degree as the bead seat 17 of the rim base. A flange 30 extends radially outwardly at the first axial end 26 of the bead seat band. A prior art rim assembly 10 may have separate side-retaining flanges 31,32 that are placed around the rim base and bead seat band, or the side-retaining flanges may be made integral to the rim base and bead seat band.

The radially inner surface 28 of the bead seat band of a prior art rim assembly has three distinct portions. The first portion 33 extends axially and radially inwardly from the first axial end 26 of the bead seat band and has a contour that is complementary to, and adjacent to the axially inner surface 23 of the second portion of the lock ring. The second portion 34 extends generally radially and axially inwardly from the first portion to a minimum radius that is only slightly larger than the radius of the outer circumferential surface of the rim base, to facilitate the sliding fit of the bead seat band around the rim base. The second portion 34 engages the sealing member 19 to form an airtight seal when a pneumatic tire (not shown) is mounted upon the rim assembly and inflated. The third portion 35 of the radially inner surface of the bead seat band extends axially inwardly from the second portion and is cylindrical, having a radius that is equal to the minimum radius of the second portion. The third portion may have an annular depression 36 therein to reduce the weight of the bead seat band.

Before assembling the components of any rim assembly, the components should be cleaned so that they are free of dirt and loose corrosion. The prior art rim assembly 10 is assembled by slidably interposing the bead seat band between a tire (not shown) and the rim base 11, placing the sealing member 19 in the annular groove 14 that is furthest from the first axial end 12 of the rim base, and then placing the split lock ring 20 in the annular groove 15 that is nearest to the first axial end of the rim base in the specified position that has already been described above. When a pressure-exerting gas, such as compressed air, is introduced into the cavity of the tire through an inflation valve (not shown), the bead seat band is forced axially outwardly until the first portion 33 of the radially inner surface of the bead seat band engages the axially inner surface 23 of the second portion of the lock ring. Simultaneously, the second portion 34 of the radially inner surface of the bead seat band engages the sealing member 19 to form an airtight seal.

Figure 2:
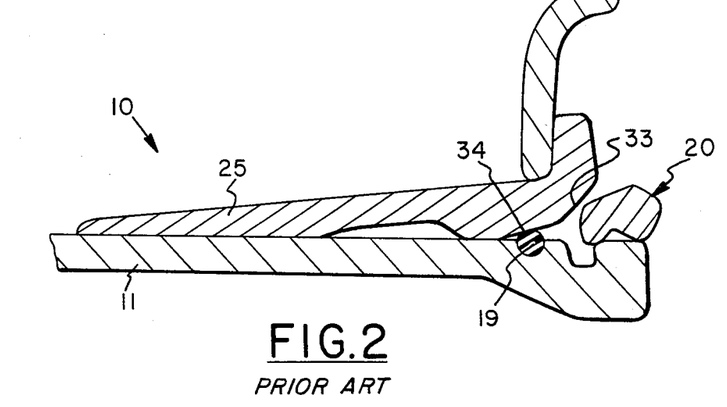
FIG. 2 is an enlarged fragmentary radial cross-sectional view of the prior art rim assembly shown in FIG. 1, wherein the lock ring is not in its specified position.

FIG. 2 is an enlarged, fragmentary radial cross-sectional view of the prior art rim assembly 10 illustrated in FIG. 1, wherein the lock ring 20 is not in its specified position. The radial and axial displacement of the lock ring may be more clearly understood by referring to FIG. 3, which is a fragmentary perspective view of the prior art rim 10 with a tire 37 mounted thereon and a portion 38 of the split lock ring 20 displaced from its specified position. It is widely recognized in the rim technology that a damaged lock ring should not be used in assembling a rim assembly and that not attempt should be made to inflate a tire mounted on a rim assembly in which the lock ring has not been placed in its specified position along its entire length. However, a person assembling a rim assembly may negligently fail to heed these widely recognized rules.

Figure 3:
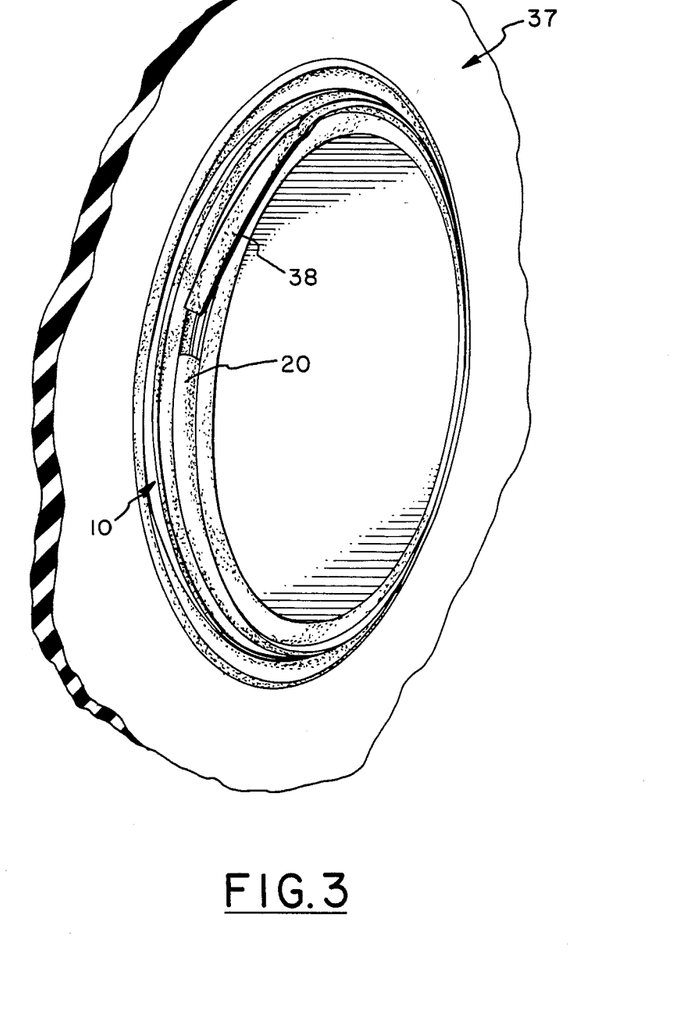
FIG. 3 is a fragmentary side perspective view of the rim assembly shown in FIG. 2, wherein a portion of the lock ring is not in its specified position.

Referring again to FIG. 2, it may be observed that even though the bead seat band 25 is not in contact with the lock ring 20 at the location where the lock ring is displaced from its specified position, the second portion 34 of the radially inner surface of the bead seat band is still engaging the sealing member 19 to form an airtight seal. This phenomena occurs because the bead seat band is forced axially outwardly by the inflation pressure in the tire (not shown) until it contacts the lock ring at some point. If the lock ring is in its specified position along most of its length, as shown in FIG. 3, the bead seat band may assume substantially the same position as it does when the assembly is properly assembled, as shown in FIG. 1. As pointed out above, it is widely recognized in the rim technology that this phenomena should be avoided.

Figure 4:
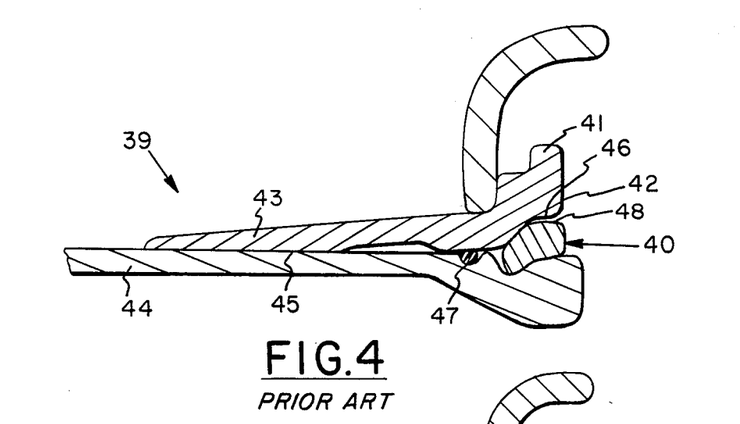
FIG. 4 is a fragmentary radial cross-sectional view of another prior art rim assembly.

There is illustrated in FIG. 4 a fragmentary radial cross-sectional view of another prior art rim assembly 39. The prior art rim assembly 39 of FIG. 4 is substantially the same as the prior art rim assembly 10 illustrated in FIG. 1, with the exceptions that it is designed to have a slightly different split lock ring 40 and has a circumferentially continuous lip 41 added at the first axial end 42 of the bead seat band 43 and second axial end (not shown) of the rim base 44. The purpose of the circumferential lip 41 is to eliminate the need for pry bar pockets in rims. Pry bar pockets are diametrically opposed pockets attached to an axial end of a rim base or bead seat band to facilitate the use of hydraulic or hand tools to unseat tire beads from the bead seat. Due to the presence of the circumferentially continuous lip 41, the radially inner surface 45 of a bead seat band of this particular prior art rim assembly has four portions rather than the three portions like the bead seat band of the prior art rim assembly illustrated in FIG. 1. The additional portion 46 of the radially inner surface of the bead seat band extends axially inwardly from the first axial end 42 of the bead seat band and is substantially cylindrical. This additional portion 46 is located radially outwardly of the radially outer surface 48 of the second portion of the lock ring. The axial length of this additional portion 46 of the radially inner surface of the bead seat band is dependent only upon the axial width of the circumferential continuous lip 41. Experiments have shown that a prior art rim assembly of the type illustrated in FIG. 4 does not prevent an airtight seal from being formed between the bead seat band 43 and the annular sealing member 47 when the entire lock ring is not in its specified position as described herein with respect to the prior art rim 10 illustrated in FIG. 1. In other words, the same undesirable phenomena described herein with respect to FIGS. 2 and 3 may also occur with a prior art rim assembly of the type shown in FIG. 4.

Figure 5:
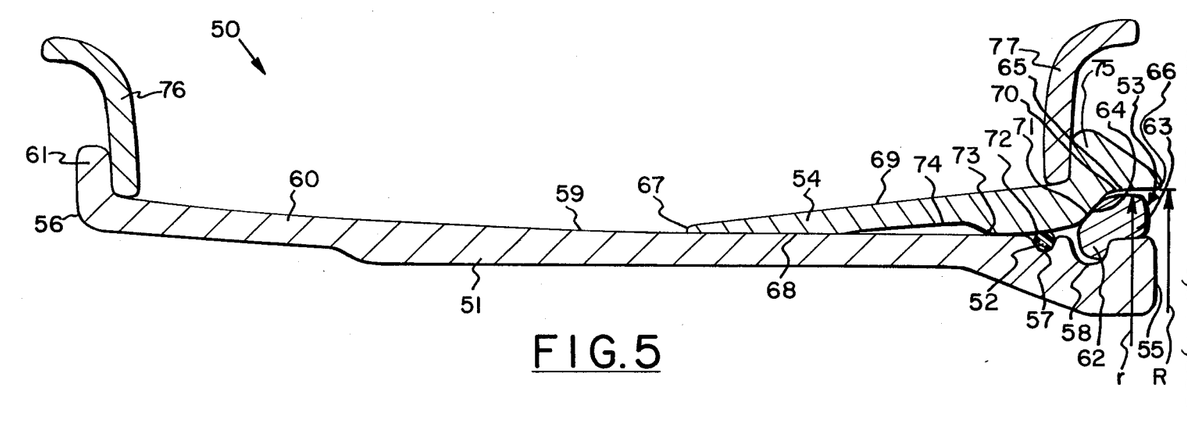
FIG. 5 is a radial cross-sectional view of a rim assembly made in accordance with the present invention.
Figure 6:
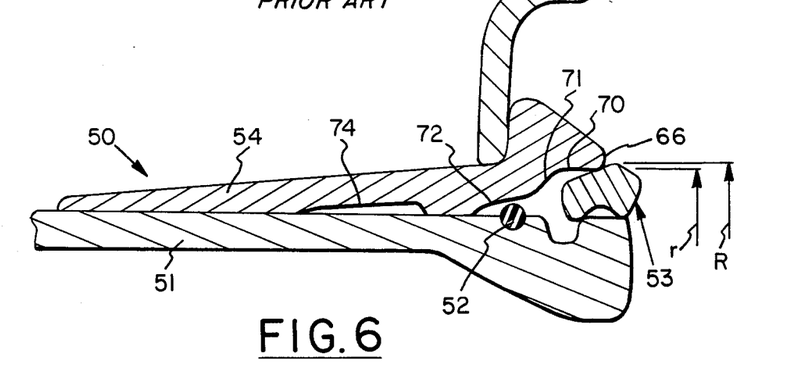
FIG. 6 is an enlarged fragmentary radial cross-sectional view of the rim assembly shown in FIG. 5, wherein the lock ring is not in its specified position.

FIG. 5 is a radial cross-sectional view of a rim assembly 50 made in accordance with the present invention in which the split lock ring is in its specified position, and FIG. 6 is an enlarged fragmentary radial cross-sectional view of the same rim assembly 50 at a location where the split lock ring is not in its specified position.

A rim assembly 50 manufactured in accordance with the present invention has four components: a rim base 51; a sealing member 52; a split lock ring 53; and a bead seat band 54.

The cylindrical rim base 50 has first 55 and second 56 axial ends and a pair of annular grooves 57,58 in the outer circumferential surface 59 of the rim base near the first axial end 55 of the rim base. A rim base made in accordance with the invention is similar enough to a prior art rim base of the type shown in FIG. 1, that a pneumatic tire that is mountable upon a prior art rim assembly could also be mounted upon a correspondingly sized rim assembly made in accordance with the invention. The rim base 51 has a bead seat 60 extending axially inwardly from its second axial end 56, and a flange 61 extending radially outwardly from the second axial end of the rim base. The bead seat may be inclined with respect to the axis of rotation of the rim assembly.

A first portion of an annular sealing member 52, such as an elastomeric "O" ring, is located in the annular groove 57 that is furthest away from the first axial end 55 of the rim base 51. A second portion of the sealing member extends radially outwardly of the outer circumferential surface 59 of the rim base.

A split lock ring 53 has a specified position such that a first portion 62 of the lock ring is located in the annular groove 58 that is closest to the first axial end 55 of the rim base. A second portion 63 of the lock ring extends radially outwardly of the outer circumferential surface 59 of the rim base and axially outwardly of the annular groove 58 that is closest to the first axial end of the rim base. The second portion of the lock ring has an axially inner surface 64 for engaging the bead seat band, and a radially outermost surface 65. The axially inner surface 64 of the second portion of the lock ring should be complementary to the second portion 71 of the radially inner surface of the bead seat band 54. The radially outermost surface of the second portion of the split lock ring has a predetermined radius r when the lock ring is in its specified position. If the lock ring has been damaged or has not been properly located in the annular groove along its entire length, then the radially outermost surface of the second portion of the split lock ring will be located radially outward of the predetermined radius r at some location, as shown in FIG. 6.

A cylindrical bead seat band 54 has first 66 and second 67 axial ends and radially inner 68 and outer 69 surfaces. The bead seat band is coaxial with, and slidably mounted about the rim base, such that the first axial end 66 of the bead seat band is nearer the first axial end 55 of the rim base than the second axial end 67 of the bead seat band. While the radially inner surface of the bead seat band of the prior art rim assembly, shown in FIG. 1, has three portions, the radially inner surface of a bead seat band in accordance with the invention comprises four distinct portions.

The first portion 70 of the radially inner surface of the bead seat band extends axially inwardly from the first axial end 66 of the bead seat band and has a predetermined axial length. The first portion is cylindrical and has a radius R that is slightly larger than the predetermined radius r of the radially outermost surface 65 of the second portion of the split lock ring. It is preferable that the radius R of the first portion of the radially inner surface of the bead seat band should be at least about 0.127 mm. larger than the predetermined radius r of the radially outermost surface of the second portion of the split lock ring to allow for manufacturing tolerances and surface blemishes in the split lock ring. As shown in FIG. 5, the first portion of the radially inner surface of the bead seat band is located radially outwardly of the radially outermost surface of the second portion of the split lock ring when the split lock ring is in its specified position.

The second portion 71 of the radially inner surface 68 of the bead seat band extends generally axially and radially inwardly from the axially inner end of the first portion 70 of this same surface, and has a contour that is complementary to the axially inner surface 64 of the second portion of the split lock ring 53. The second portion of the radially inner surface of the bead seat band is adjacent to and engages the axially inner surface of the second portion of the split lock ring when the lock ring is in its specified position.

The third portion 72 of the radially inner surface of the bead seat band 54 extends generally axially and radially inwardly from the axially inner end of the second portion 71 of the same surface to a minimum diameter that is only slightly larger than the diameter of the outer circumferential surface 59 of the rim base 51. The minimum radius of the inner surface of the bead seat band should be sufficiently larger than the diameter of the outer circumferential surface of the rim base to provide a sliding fit in accordance with accepted engineering practice. It is widely known that as long as the mating surfaces are clean and free of loose corrosion, a sliding fit is not an airtight fit. Therefore, it is necessary that the third portion of the radially inner surface of the bead seat band engage the sealing member 52 to form an airtight seal when the lock ring is in its specified position. The contour of the third portion may be a taper of constant or varying degrees, or may even be curved, and the axial length of the third portion is a function of the contour that is selected by the designer.

The fourth portion 73 of the radially inner surface of the bead seat band 54 extends axially inwardly from the axially inner end of the third portion 72 of the same surface to the second axial end 67 of the bead seat band. The fourth portion is cylindrical, and has a radius equal to the minimum radius of the third portion. A designer or engineer may elect to have an annular depression 74 in the fourth portion of the radially inner surface of the bead seat band to reduce the weight of the assembly, without deviating from the scope of the invention.

Referring still to FIG. 5, the radially outer surface 69 of a bead seat band 54 of a rim assembly according to the invention is similar to the bead seat band of a comparable size prior art rim assembly. The radially outer surface 69 of the bead seat band is inclined, with respect to the axis of rotation of the assembly, to the same degree as the bead seat 60 of the rim base. A flange 75 extends radially outwardly at the first axial end 66 of the rim base.

Figure 9:
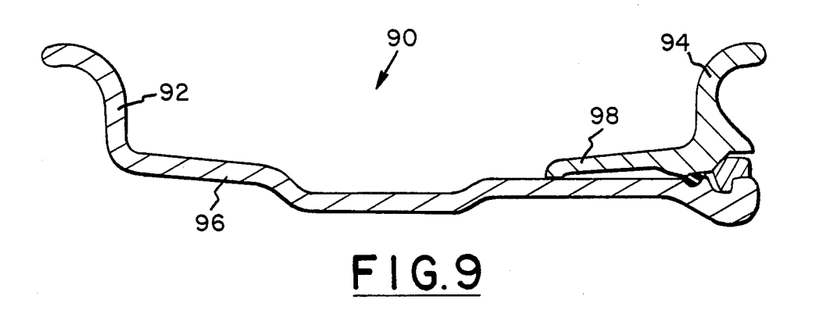
FIG. 9 is a radial cross-sectional view of another rim assembly made in accordance with the invention.

A rim assembly 50 according to the invention, as illustrated in FIG. 5, may have separate side-retaining flanges 76,77 that are slidingly placed around the rim base and the bead seat band. However, it is understood that a rim assembly 90 according to the invention, as illustrated in FIG. 9, may have side-retaining flanges 92,94 that are integral to the rim base 96 and bead seat band 98 without deviating from the scope of the invention.

Referring now to FIG. 6, there is shown an enlarged, fragmentary view of the rim assembly 50 of FIG. 5, with the split lock ring 53 displaced radially and axially outwardly from its specified position. The manner in which the split lock ring may be displaced is illustrated in FIG. 3, and has been discussed above. Since the split lock ring is displaced radially outwardly beyond both the radius r which the radially outermost surface of the split lock ring has when it is in its specified position, and the radius R of the first portion 70 of the radially inner surface of the bead seat band 54, the first axial end 66 of the bead seat band will contact the split lock ring if an attempt is made to inflate a tire (not shown) mounted on the rim assembly. Therefore, the third portion 72 of the radially inner surface of the bead seat band is unable to engage the sealing member 52 and form an airtight seal. In other words, in a rim assembly according to the invention the axial length of the first portion of the radially inner surface of the bead seat band is of such magnitude that if the first axial end of the bead seat band comes into contact with the lock ring, due to any part of the lock ring not being in its specified position, the third portion of the radially inner surface of the bead seat band will be unable to engage the sealing member and form an airtight seal when a tire is mounted upon the rim assembly and an attempt is made to inflate the tire.

Figure 7:
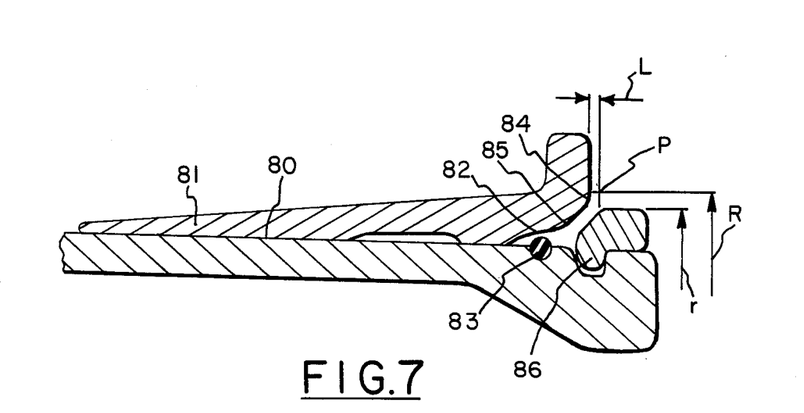
FIGS. 7 and 8 are fragmentary radial cross-sectional views illustrating a method of determining the dimensions of a rim assembly in accordance with the invention.

It has been found that the most expedient method of determining the axial length of the first portion of the radially inner surface of the bead seat band is to use radial cross-sectional templates of each component of the rim assembly made to a preselected scale, most preferably a 1-to-1 scale. FIG. 7 is an example of a template that may be referred to for understanding how the determination is made. While the template illustrated in FIG. 7 is a fragmentary view showing only a portion of the rim base, it is understood that the dimensions of a bead seat band according to the invention can be made with a template that represents the entire width of the rim base. The axial length of the first portion of the radially inner surface 80 of the bead seat band 81 in accordance with the invention is at least as great as the axial distance L determined by sliding the bead seat band 81 axially inwardly with respect to the rim assembly so that the third portion 82 of the radially inner surface of the bead seat band does not contact the sealing member 83, then measuring the axial distance L from the axially outermost end 84 of the second portion 85 of the radially inner surface of the bead seat band to the axially innermost point P where the lock ring 86 intersects a cylinder that is coaxial with the assembly and has the same radius R as the first portion (not included in the template) of the radially inner surface of the bead seat band when the lock ring is displaced radially outwardly from its specified position.

Figure 8:
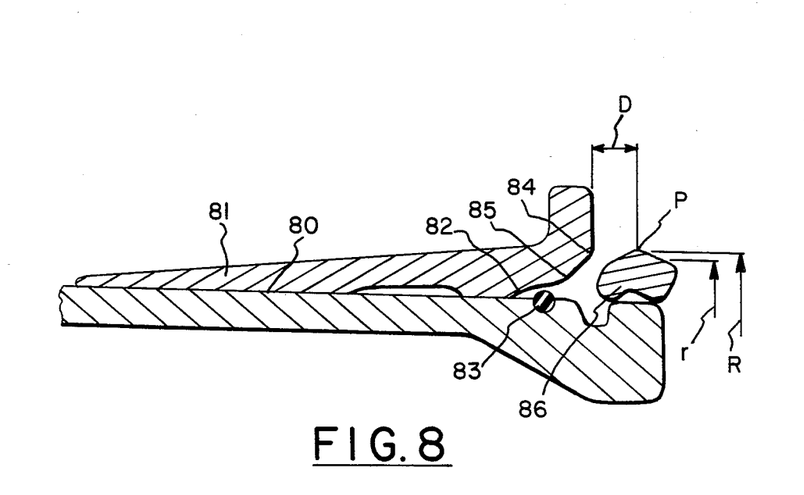

Since, as illustrated in FIG. 6, the split lock ring may be displaced both radially and axially from its specified position, it is preferable that the axial length of the first portion of the radially inner surface of the bead seat band be greater than the length L determined by the procedure set forth in the preceding paragraph. The axial displacement of the split lock ring may be increased in those instances where the designer chooses to have the walls of the groove for the lock ring tapered at a low angle, such as in the prior art rim 39 illustrated in FIG. 4. FIG. 8 is another view of the same template shown in FIG. 7, and may be referred to for understanding how to determine the preferred axial length D of the first portion of the radially inner surface 80 of the bead seat band 81. Preferably, the axial length of the first portion of the radially inner surface 80 of the bead seat band 81 in accordance with the invention is at least as great as the axial distance D determined by sliding the bead seat band 81 axially inwardly, with respect to the rim assembly, so that the third portion 82 of the radially inner surface of the bead seat band does not contact the sealing member 83 then measuring the axial distance D from the axially outermost end 84 of the second portion 85 of the radially inner surface of the bead seat band to the axially outermost point P where the lock ring 86 intersects a cylinder that is coaxial with the assembly and has the same radius R as the first portion (not included in the template) of the radially inner surface of the bead seat band when the lock ring is displaced both radially and axially outwardly and twisted at the same time. This type of displacement, with twisting, of the lock ring is illustrated in FIG. 3.

The invention is most advantageously used in conjunction with a tubeless pneumatic tire because if the components of the rim assembly cannot form an airtight seal due to part of the lock ring not being in its specified position, the tubeless tire cannot be inflated. A tire requiring the use of an innertube may also be mounted on a rim assembly manufactured according to the invention, but the innertube could be inflated even though a part of the lock ring is not in its specified position.

While certain representative embodiments and details have been shown for the purpose of illustrating the invention, it will be apparent to those skilled in the art that various changes and modifications may be made therein without departing from the spirit or scope of the invention.

What is claimed is:

1. A rim assembly for mounting a pneumatic tire thereon, said rim assembly comprising:
   (a) a cylindrical rim base having first and second axial ends and a pair of annular grooves in an outer circumferential surface of said rim base near said first axial end;
   (b) an annular sealing member, a first portion of said sealing member being located in the annular groove that is furthest away from the first axial end of said rim base and a second portion of said sealing member extending radially outwardly of the radially outer circumferential surface of said rim base;
   (c) a split lock ring, said lock ring having a specified position such that a first portion of said lock ring is located in the annular groove that is closest to the first axial end of said rim base, a second portion of said lock ring extending radially outwardly of said rim base and axially outwardly of the annular groove that is closest to the first axial end of said rim base, said second portion having an axially inner surface for engaging a bead seat band and a radially outermost surface that has a predetermined radius when the lock ring is in said specified position; and
   (d) a generally cylindrical bead seat band having first and second axial ends and radially inner and outer surfaces, said bead seat band being coaxial with and slidably mounted about said rim base such that the first axial end of the bead seat band is the nearest to the first axial end of said rim base, the radially inner surface of said bead seat band comprising:
      (i) a first portion that is cylindrical, said first portion having a radius that is slightly larger than the predetermined radius of the radially outermost surface of the second portion of said lock ring, said first portion extending from the first axial end of said bead seat band for a predetermined axial length, said first portion being located radially outwardly of the radially outermost surface of the second portion of said lock ring when said lock ring is in said specified position;
      (ii) a second portion extending generally axially and radially inwardly from the axially inner end of said first portion and having a contour that is complementary to the axially inner surface of the second portion of said lock ring, said second portion engaging the axially inner surface of the second portion of said lock ring when said lock ring is in said specified position;
      (iii) a third portion that is inclined generally axially and radially inwardly from the axially inner end of said second portion to a minimum radius, said minimum radius being only slightly larger than the radius of the outer circumferential surface of said rim base, said third portion engaging said sealing member to form an airtight seal when said lock ring is in said specified position; and
      (iv) a fourth portion extending axially inwardly from the axially inner end of said third portion, said fourth portion being cylindrical and having said minimum radius;
   the axial length of the first portion of the radially inner surface of said bead seat band is measured from the first axial end of said bead seat band to an axially outer end of the second portion of the radially inner surface of the bead seat band, and when the bead seat band is slid axially inwardly so that the third portion of the radially inner surface of the bead seat band does not contact the sealing member said axial length is at least as great as the axial distance from the axially outermost end of the second portion of the radially inner surface of said bead seat band to the axially innermost point where said lock ring intersects a cylinder that is coaxial with said assembly when any part of said lock ring is displaced radially outwardly from said specified position, said cylinder having the same radius as the radius of the first portion of the radially inner surface of said bead seat band.

2. A rim assembly as described in claim 1, wherein the axial length of the first portion of the radially inner surface of said bead seat band is at least as great as the axial distance determined by sliding the bead seat band axially inwardly with respect to the rim assembly, so that the third portion of the radially inner surface of the bead seat band does not contact the sealing member then measuring the axial distance from the axially outermost end of the second portion of the radially inner surface of the bead seat band to the axially outermost point where the lock ring intersects a cylinder that is coaxial with the assembly and has the same radius as the first portion of the radially inner surface of the bead seat band when the lock ring is displaced both radially and axially outwardly and twisted at the same time.

3. A rim assembly for mounting a pneumatic tire thereon, said rim assembly comprising:
- (a) a cylindrical rim base having first and second axial ends and a pair of annular grooves in an outer circumferential surface of said rim base near said first axial end;
- (b) an annular sealing member, a first portion of said sealing member being located in the annular groove that is furthest away from the first axial end of said rim base and a second portion of said sealing member extending radially outwardly of the radially outer circumferential surface of said rim base;
- (c) a split lock ring, said lock ring having a specified position such that a first portion of said lock ring is located in the annular groove that is closest to the first axial end of said rim base, a second portion of said lock ring extending radially outwardly of said rim base and axially outwardly of the annular groove that is closest to the first axial end of said rim base, said second portion having an axially inner surface for engaging a bead seat band and a radially outermost surface that has a predetermined radius when the lock ring is in said specified position; and
- (d) a generally cylindrical bead seat band having first and second axial ends and radially inner and outer surfaces, said bead seat band being coaxial with and slidably mounted about said rim base such that the first axial end of the bead seat band is nearer the first axial end of said rim base, the radially inner surface of said bead seat band comprising:
  - (i) a first portion that is cylindrical, said first portion having a radius that is slightly larger than the predetermined radius of the radially outermost surface of the second portion of said lock ring, said first portion extending from the first axial end of said bead seat band for a predetermined axial length, said first portion being located radially outwardly of the radially outermost surface of the second portion of said lock ring when said lock ring is in said specified position;
  - (ii) a second portion extending generally axially and radially inwardly from the axially inner end of said first portion and having a contour that is complementary to the axially inner surface of the second portion of said lock ring, said second portion engaging the axially inner surface of the second portion of said lock ring when said lock ring is in said specified position;
  - (iii) a third portion that is inclined generally axially and radially inwardly from the axially inner end of said second portion to a minimum radius, said minimum radius being only slightly larger than the radius of the outer circumferential surface of said rim base, said third portion engaging said sealing member to form an airtight seal when said lock ring is in said specified position; and
  - (iv) a fourth portion extending axially inwardly from the axially inner end of said third portion, said fourth portion being cylindrical and having said minimum radius;
- the axial length of the first portion of the radially inner surface of said bead seat band being of such magnitude that if the first axial end of said bead seat band comes into contact with said lock ring, due to any part of said lock ring not being in said specified position, the third portion of the radially inner surface of said bead seat band will be unable to engage said sealing member and form an airtight seal when a tire is mounted upon said rim assembly and an attempt is made to inflate said tire.

* * * * *

UNITED STATES PATENT AND TRADEMARK OFFICE
CERTIFICATE OF CORRECTION

PATENT NO. : B1 4,574,859

DATED : November 28, 1989

INVENTOR(S) : William T. Smith

It is certified that error appears in the above-identified patent and that said Letters Patent is hereby corrected as shown below:

Title page:

Change assignor from "Motor Wheel Corporation" to

--Dotson Wheel Corporation, Inc., Saltville, Va--.

Signed and Sealed this

Thirtieth Day of October, 1990

Attest:

HARRY F. MANBECK, JR.

*Attesting Officer*     *Commissioner of Patents and Trademarks*

REEXAMINATION CERTIFICATE (1161st)

United States Patent [19]

Smith

[11] B1 4,574,859

[45] Certificate Issued  Nov. 28, 1989

[54] RIM ASSEMBLY

[75] Inventor: William T. Smith, Uniontown, Ohio

[73] Assignee: Motor Wheel Corporation

Reexamination Request:
No. 90/001,659, Dec. 5, 1988

Reexamination Certificate for:
Patent No.: 4,574,859
Issued: Mar. 11, 1986
Appl. No.: 734,241
Filed: May 14, 1985

Related U.S. Application Data

[63] Continuation of Ser. No. 458,240, Jan. 17, 1983, abandoned.

[51] Int. Cl.$^4$ .............................................. B60B 25/18
[52] U.S. Cl. ............................. 152/410; 152/DIG. 10
[58] Field of Search ..................... 301/35 SL, 95–98; 152/396, 398, 406, 409, 410, DIG. 10

[56] References Cited

U.S. PATENT DOCUMENTS

| | | | |
|---|---|---|---|
| 2,468,947 | 5/1949 | Sinclair | 152/410 |
| 2,808,870 | 10/1957 | Riggs | 152/410 |
| 2,884,984 | 5/1959 | Riggs | 152/410 |
| 2,894,556 | 7/1959 | Darrow | 152/410 |
| 3,118,485 | 1/1964 | Le Jeune | 152/410 |
| 3,743,000 | 7/1973 | Verdier | 157/1.33 |
| 3,882,919 | 5/1975 | Sons, Jr. et al. | 152/410 |
| 4,438,797 | 3/1984 | Suckow | 152/410 |
| 4,706,723 | 11/1987 | Zoeber et al. | 152/410 |

FOREIGN PATENT DOCUMENTS

| | | | |
|---|---|---|---|
| 1207813 | 12/1965 | Fed. Rep. of Germany | |
| 7440197 | 12/1974 | France | |
| 754719 | 8/1956 | United Kingdom | |
| 819551 | 9/1959 | United Kingdom | 152/410 |

OTHER PUBLICATIONS

Motor Wheel Catalog EM79-2340 (Jun. 1979), p. 8.

Primary Examiner—Russell D. Stormer

[57] ABSTRACT

A multi-piece rim assembly comprises a rim base, sealing member, lock ring and bead seat band. The sealing member and lock ring have specified positions such that each is at least partially disposed in an annular groove in the radially outer surface of the rim base, with the lock ring being nearer to an axial end of the rim base than the sealing member. The bead seat band is coaxial with and slidably mounted around the rim base. When all of the components of the rim assembly are in their specified positions, the bead seat band engages the sealing member to form an airtight seal. If the entire lock ring is not in its specified position, an axial end of the bead seat band contacts the lock ring and prevents the airtight seal from being formed.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 3 is confirmed.

Claim 1 is determined to be patentable as amended.

Claim 2, dependent on an amended claim, is determined to be patentable.

New claims 4, 5, and 6 are added and determined to be patentable.

1. A rim assembly for mounting a pneumatic tire thereon, said rim assembly comprising:
   (a) a cylindrical rim base having first and second axial ends and a pair of annular grooves in an outer circumferential surface of said rim base near said first axial end, *said grooves being spaced apart from each other axially along said outer circumferential surface of said rim base and separated from each other by a portion of said rim base protruding between said grooves and defining that portion of said circumferential surface disposed between said grooves;*
   (b) an annular sealing member, a first portion of said sealing member being located in the annular groove that is furthest away from the first axial end of said rim base and a second portion of said sealing member extending radially outwardly of the radially outer circumferential surface of said rim base;
   (c) a split lock ring, said lock ring having a specified position such that a first portion of said lock ring is located in the annular groove that is closest to the first axial end of said rim base, a second portion of said lock ring extending radially outwardly of the annular groove that is closest to the first axial end of said rim base, said second portion having an axially inner surface for engaging a bead seat band and a radially outermost surface that has a predetermined radius when the lock ring is in said specified position; and
   (d) a generally cylindrical bead seat band having first and second axial ends and radially inner and outer surfaces, said bead seat band being coaxial with and slidably mounted about *said outer circumferential surface of* said rim base such that the first axial end of the bead seat band is the nearest to the first axial end of said rim base, the radially inner surface of said bead seat band comprising:
   (i) a first *surface* portion that is cylindrical *and circumferentially continuous*, said first portion having a radius that is slightly larger than the predetermined radius of the radially outermost surface of the second portion of said lock ring, said first portion extending from the first axial end of said bead seat band for a predetermined axial length, said first portion being located radially outwardly of the radially outermost surface of the second portion of said lock ring when said lock ring is in said specified position;
   (ii) a second *surface* portion extending generally axially and radially inwardly from the axially inner end of said first portion and having a contour that is complementary to the axially inner surface of the second portion of said lock ring, said second portion engaging the axially inner surface of the second portion of said lock ring when said lock ring is in said specified position;
   (iii) a third *surface* portion that is inclined generally axially and radially inwardly from the axially inner end of said second portion to a minimum radius, said minimum radius being only slightly larger than the radius of the outer circumferential surface of said rim base, said third portion engaging said sealing member to form an airtight seal when said lock ring is in said specified position; and
   (iv) a fourth *surface* portion extending axially inwardly from the axially inner end of said third portion, said fourth portion being cylindrical and having said minimum radius;
   the axial length of the first portion of the radially inner surface of said bead seat band [is] *being* measured from the first axial end of said bead seat band to an axially outer end of the second portion of the radially inner surface of the bead seat band, and when the bead seat band is slid axially inwardly so that the third portion of the radially inner surface of the bead seat band does not contact the sealing member, said axial length is at least as great as the axial distance from the axially outermost end of the second portion of the radially inner surface of said bead seat band to the axially innermost point where said lock ring intersects a cylinder that is coaxial with said assembly when any part of said lock ring is displaced radially outwardly from said specified position, said cylinder having the same radius as the radius of the first portion of the radially inner surface of said bead seat band.

4. *The rim assembly as set forth in claim 3 wherein said annular grooves (57, 58) are spaced apart from each other axially along said rim base (51) and separated from each other by a portion of said rim base protruding between said grooves and defining that portion of said circumferential surface disposed between said grooves.*

5. *The rim assembly as set forth in claim 4 wherein the axial length of the first portion (70) of the radially inner surface of said bead seat band is measured from the first axial end of said bead seat band to an axially outer end of the second portion of the radially inner surface of the bead seat band; and when the bead seat band (54) is slid axially inwardly so that the third portion (72) of the radially inner surface of the bead seat band does not contact the sealing member (52), said axial length is at least as great as the axial distance (L) from the axially outermost end (84) of the second portion (71) of the radially inner surface of said bead seat band to the axially innermost point (P) where said lock ring (53) intersects a cylinder that is coaxial with said assembly when any part of said lock ring is displaced radially outwardly from said specified position, said cylinder having the same radius as the radius (R) of the first portion (70) of the radially inner surface of said bead seat band.*

6. The rim assembly as set forth in claim 4 wherein the axial length of the first portion (70) of the radially inner surface of said bead seat band (54) is at least as great as the axial distance (D) determined by sliding the bead seat band axially inwardly with respect to the rim assembly, so that the third portion (70) of the radially inner surface of the bead seat band does not contact the sealing member (52), then measuring the axial distance (L) from the axially outermost end (84) of the second portion (71) of the radially inner surface of the bead seat band to the axially outermost point (P) where the lock ring (53) intersects a cylinder that is coaxial with the assembly and has the same radius (R) as the first portion (70) of the radially inner surface of the bead seat band when the lock ring is displaced both radially and axially outwardly and twisted at the same time.

* * * * *